United States Patent
Izumi et al.

(10) Patent No.: US 9,166,436 B2
(45) Date of Patent: Oct. 20, 2015

(54) PORTABLE ELECTRONIC APPARATUS AND CHARGING APPARATUS

(75) Inventors: Hiroshi Izumi, Tokyo (JP); Kazuhiro Kuroda, Kanagawa (JP); Takaki Kanno, Tokyo (JP)

(73) Assignees: SONY CORPORATION, Tokyo (JP); SONY MOBILE COMMUNICATIONS INC., Tokyo (JP)

(*) Notice: Subject to any disclaimer, the term of this patent is extended or adjusted under 35 U.S.C. 154(b) by 1197 days.

(21) Appl. No.: 12/973,487

(22) Filed: Dec. 20, 2010

(65) Prior Publication Data
US 2011/0254501 A1    Oct. 20, 2011

Related U.S. Application Data

(60) Provisional application No. 61/325,650, filed on Apr. 19, 2010.

(51) Int. Cl.
| | |
|---|---|
| H02J 7/00 | (2006.01) |
| G06F 1/26 | (2006.01) |
| H02J 9/06 | (2006.01) |
| H02J 7/34 | (2006.01) |

(52) U.S. Cl.
CPC ............. *H02J 7/0068* (2013.01); *G06F 1/263* (2013.01); *H02J 9/061* (2013.01); *H02J 7/34* (2013.01)

(58) Field of Classification Search
USPC .................. 320/107, 112–114, 117, 128, 134
See application file for complete search history.

(56) References Cited

U.S. PATENT DOCUMENTS

| | | | |
|---|---|---|---|
| 7,183,748 B1 * | 2/2007 | Unno et al. ................ | 320/136 |
| 2007/0214296 A1 * | 9/2007 | Takamatsu et al. .......... | 710/63 |
| 2007/0262651 A1 | 11/2007 | Odaohara | |
| 2013/0082662 A1 * | 4/2013 | Carre et al. ................. | 320/134 |

FOREIGN PATENT DOCUMENTS

| | | |
|---|---|---|
| EP | 0 588 569 A2 | 3/1994 |
| EP | 0 704 790 A2 | 4/1996 |
| EP | 1 919 058 A2 | 5/2008 |
| JP | 2008-104270 | 5/2008 |

OTHER PUBLICATIONS

Extended European Search Report issued Jun. 18, 2014 in Patent Application No. 11155200.6.

* cited by examiner

*Primary Examiner* — Yalkew Fantu
(74) *Attorney, Agent, or Firm* — Oblon, McClelland, Maier & Neustadt, L.L.P.

(57) ABSTRACT

A portable electronic device including a battery, a direct current (DC) power source, a first device that consumes a first amount of power during operation, a second device that consumes a second amount of power during operation, the second amount of power being more than the first amount of power, a first switch provided in a charging path between the DC power source and the battery, a second switch provided in a path for supplying power from the battery to the second device, and a charging control circuit that controls charging the battery by connecting the first switch when external power is supplied via the DC power source, and control the second switch to be connected and the first switch to be disconnected when the second device is operated during the charging.

13 Claims, 3 Drawing Sheets

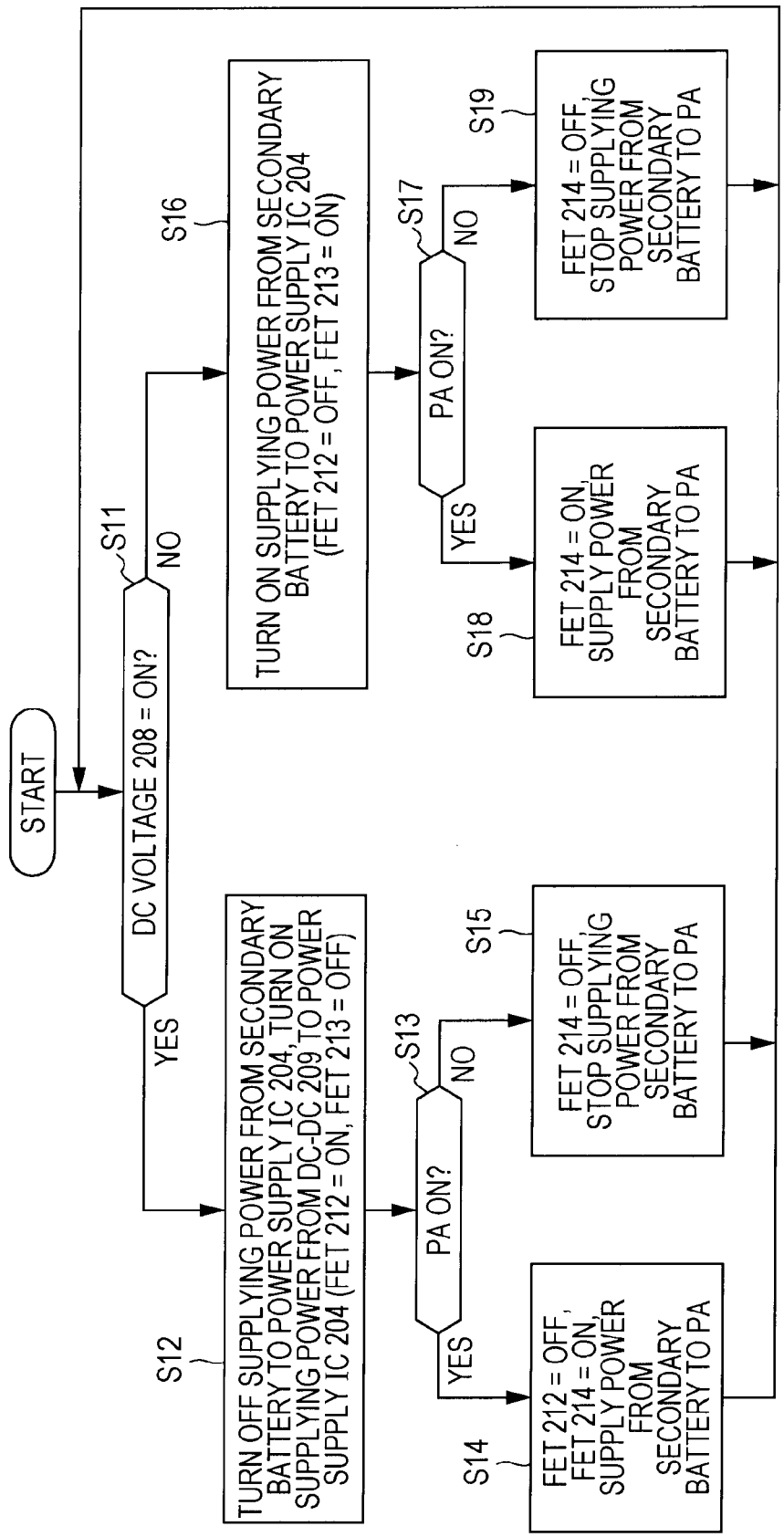

PORTABLE ELECTRONIC APPARATUS AND CHARGING APPARATUS

CROSS REFERENCE TO RELATED APPLICATION

This application claims the benefit of priority of Provisional Application Ser. No. 61/325,650, filed Apr. 19, 2010, the entire contents of which is incorporated herein by reference.

BACKGROUND OF THE INVENTION

1. Field of the Invention

The present invention relates to a portable electronic apparatus having a secondary battery therein, the secondary battery being a battery that can be charged, and also relates to a charging apparatus for the portable electronic apparatus.

2. Description of the Related Art

A portable electronic apparatus such as a portable phone terminal has a secondary battery therein, the secondary battery being a battery that can be charged using an external power supply. Regarding a charging control device for such a secondary battery, a technology for accurately controlling a charging voltage and detecting a charging current while suppressing heat generation during charging has been suggested (see Japanese Unexamined Patent Application Publication No. 2008-104270).

In order to increase charging efficiency during charging of a secondary battery, the following method is adopted. That is, a power supply voltage supplied from the outside to a charging integrated circuit (charging IC) is decreased by a direct current-direct current (DC-DC) converter and is supplied to a power supply IC, and the secondary battery is charged.

With this method, power can be supplied from the secondary battery when it becomes necessary for the power supply IC to supply a current beyond the ability of power supplied from the outside. For this purpose, a rapid fluctuation of load is detected on the basis of a fluctuation of the voltage of supplied power having a decreased voltage and a result of a current monitor by using a so-called battery assist function, and a power supply path is switched by using a switch, such as a field-effect transistor (FET).

FIG. 1 illustrates a configuration of a charging system in a portable phone terminal according to the related art.

A power supply IC 104 supplies power to devices, such as a baseband (BB) IC 100 including a communication unit and a central processing unit (CPU), a peripheral device 102 such as a liquid crystal display (LCD) device or camera, and a memory 101. The power supply IC 104 includes a power supply circuit (low dropout (LDO) regulator, DC-DC converter, or the like) 111 that stably outputs operation voltages of the respective devices.

Normally, power is supplied from a secondary battery 110 to the power supply IC 104. When a DC voltage 108 is applied from an external charger or the like to a charging IC 114, a voltage output from a DC-DC converter 109 of the charging IC 114 is supplied. Such paths are controlled by a charging control circuit 107 of the charging IC 114. A voltage is directly applied from the secondary battery 110, not via the power supply IC 104, to power amplifiers of a third-generation portable phone (3G PAs 105) and a power amplifier of a global system for mobile communications (GSM) portable phone (GSM PA 106), the 3G PAs 105 and the GSM PA 106 serving as devices that consume a relatively large amount of power.

In the existing configuration illustrated in FIG. 1, when the DC voltage 108 is applied, the charging control circuit 107 detects it and turns on a FET 112 (the FET 112 is connected), thereby starting charging of the secondary battery 110. At this time, when a current that can be supplied by the DC voltage 108 is smaller than the sum of a current supplied to devices connected to the power supply IC 104 and a current supplied to the 3G PAs 105 and the GSM PA 106, the charging control circuit 107 turns on a FET 113, switches a power supply path from the DC-DC converter 109 to the secondary battery 110, and stops output of the DC-DC converter 109 at the same time. The devices connected to the power supply IC 104 include the memory 101, the peripheral device 102, antenna switches (ANT SWs) 103, and the BB IC 100 in this example.

SUMMARY OF THE INVENTION

When such an operation is performed, the characteristics of a device that is sensitive to the voltage and impedance of a power supply are disadvantageously affected while the path is switched by a FET switch. In the above-described example, a stable power supply (voltage and impedance) is typically necessary for the 3G PAs 105 and the GSM PA 106, but the stable operation thereof is not ensured due to a change in voltage and impedance that occurs while a supply path is switched by a FET switch or the like.

Also, the secondary battery 110 can be brought into a fully-charged state by applying its maximum charging voltage (e.g., 4.2 V) or more thereto. On the other hand, the maximum voltage of the secondary battery 110 is determined by a device that is directly connected to the secondary battery 110, such as the 3G PAs 105. Therefore, a secondary battery having a maximum voltage of 4.4 V is not used, which disadvantageously decreases the degree of freedom of a battery voltage and a charging voltage. As a result, a charging voltage supplied to the secondary battery 110 decreases, charging to achieve a fully-charged state is not realized, and the charging rate decreases disadvantageously.

Accordingly, it is desirable to provide a portable electronic apparatus that is capable of ensuring a stable operation of a device that consumes a relatively large amount of power and satisfying a request for full charge of a secondary battery, and to provide a charging apparatus for the portable electronic apparatus.

According to an embodiment of the present invention, there is provided a portable electronic device including a battery, a DC power source, a first device that consumes a first amount of power during operation, a second device that consumes a second amount of power during operation, the second amount of power being more than the first amount of power, a first switch provided in a charging path between the DC power source and the battery, a second switch provided in a path for supplying power from the battery to the second device, and a charging control circuit that controls charging the battery by connecting the first switch when external power is supplied via the DC power source, and control the second switch to be connected and the first switch to be disconnected when the second device is operated during the charging.

With this configuration, when the second device that consumes a relatively large amount of power is to be operated during charging of the battery, a power supply to the device is switched from an output of the DC power source to the secondary battery.

BRIEF DESCRIPTION OF THE DRAWINGS

FIG. 3 is a flowchart illustrating an operation example of a charging control circuit illustrated in FIG. 2.

DESCRIPTION OF THE PREFERRED EMBODIMENT

Hereinafter, an embodiment of the present invention will be described in detail.

Figure 2:
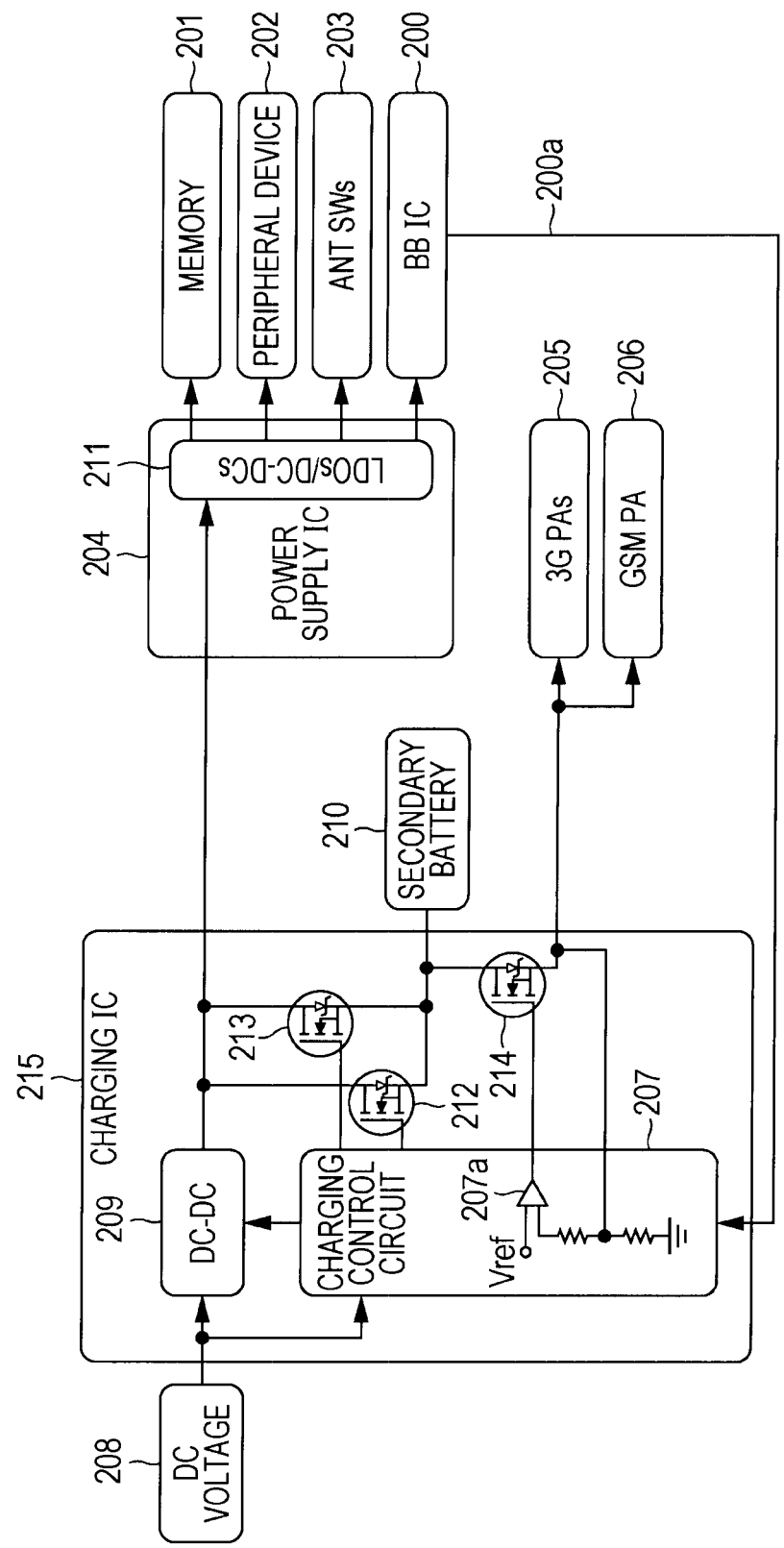
FIG. 2 is a diagram illustrating a configuration example of a portable phone terminal having a charging IC and a power supply IC therein according to an embodiment of the present invention.

FIG. 2 illustrates a configuration example of a portable phone terminal having a charging IC and a power supply IC therein, which is an example of a portable electronic apparatus according to this embodiment.

A power supply IC 204 supplies power to devices that consume a relatively small amount of power, such as a baseband (BB) IC 200 including a communication unit and a control unit (central processing unit (CPU)) that are not illustrated, a peripheral device 202 such as a liquid crystal display (LCD) device or a camera, and a memory 201. The BB IC 200 functions as a processing control unit that controls processing of the portable phone terminal. The power supply IC 204 includes a power supply circuit (low dropout (LDO) regulator, DC-DC converter, or the like) 211 that stably outputs operation voltages of the respective devices.

Normally, power is supplied from a secondary battery 210 to the power supply IC 204. When a DC voltage 208 that is input from an external charger or the like is applied to a charging IC 215, a voltage output from a DC-DC converter 209 of the charging IC 215 is supplied. Such paths are controlled by a charging control circuit 207 of the charging IC 215. In order to increase charging efficiency for charging the secondary battery 210, the DC-DC converter 209 decreases a power supply voltage supplied from the outside to the charging IC 215 and supplies the voltage to the power supply IC 204, and also charges the secondary battery 210.

Power amplifiers of a third-generation portable phone (3G PAs 205) and a power amplifier of a GSM portable phone (GSM PA 206) are devices that consume a relatively large amount of power compared to the devices connected to the power supply IC 204. A voltage is applied to these devices from the secondary battery 210 via a FET 214, not via the power supply IC 204, under control by the charging control circuit 207.

A FET 212 serving as a first switch is provided in a charging path extending from the DC-DC converter 209 to the secondary battery 210.

The FET 214 serving as a second switch is provided in a path for directly supplying power from the secondary battery 210 to the devices that consume a relatively large amount of power.

Furthermore, a FET 213 serving as a third switch is provided in a path for supplying power from the secondary battery 210 to the power supply IC 204.

When the DC voltage 208 is applied as a power supply voltage from the outside, the charging control circuit 207 detects it and turns on the FET 212, thereby starting charging of the secondary battery 210. When a device that consumes a relatively large amount of power is to be operated during charging, control is performed to turn on the FET 214 and turn off the FET 212. Also, the charging control circuit 207 turns on the FET 213 serving as the third switch when no power supply voltage is supplied from the outside, and turns off the FET 213 while a power supply voltage is supplied from the outside.

Figure 1:
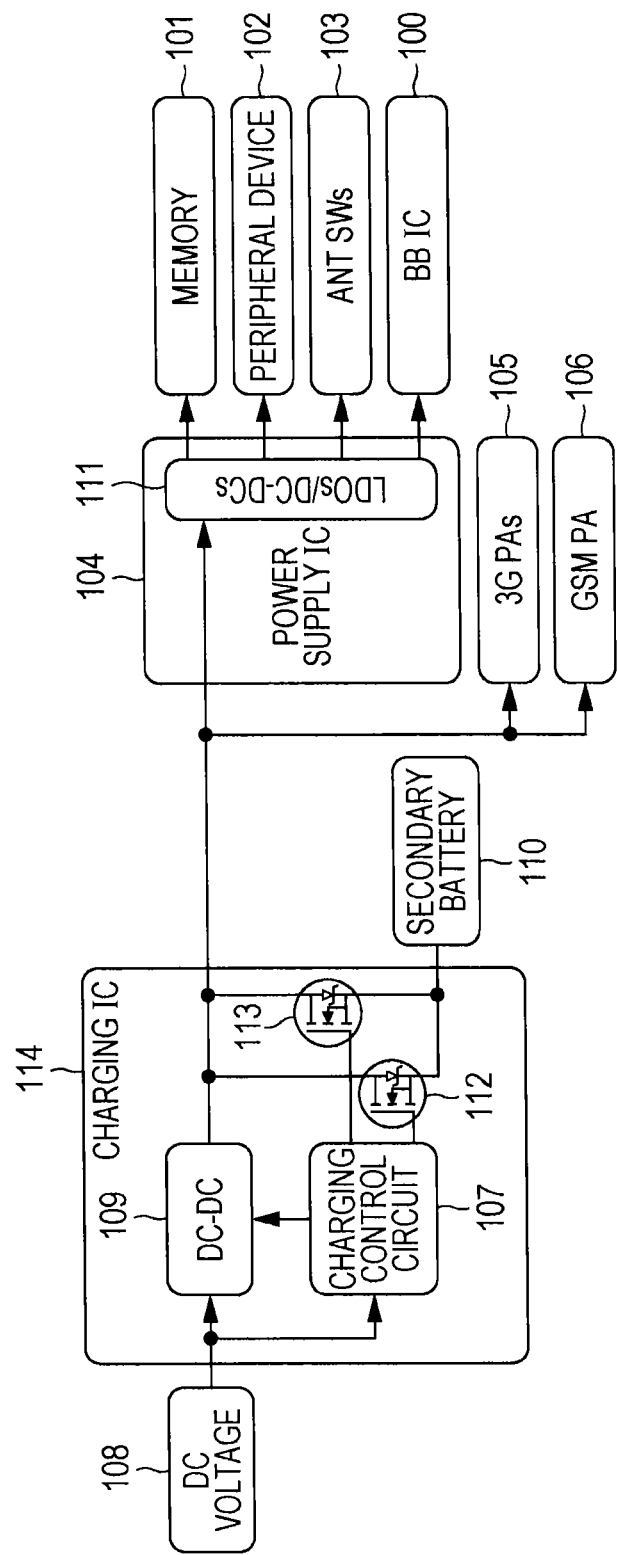
FIG. 1 is a diagram illustrating a configuration of a charging system in a portable phone terminal according to a related art.

A factor of causing a rapid fluctuation of load in a portable phone terminal is a power amplifier (PA), and the timing to turn on the PA is controlled by the BB IC 200. Also, any other factors of causing a fluctuation of load can be observed by the BB IC 200, for example, at the startup of an application. The BB IC 200 notifies the charging control circuit 207 of the charging IC 215 of the timing to cause a fluctuation of load, such as an ON signal of the PA, by using a control signal 200a. The charging control circuit 207 that has received the notification compares an output voltage of the FET 214 with a reference voltage Vref by using a comparator (operational amplifier) 207a, controls the FET 214 so that an intended voltage is output, and supplies power from the secondary battery 210 to the 3G PAs 205 and the GSM PA 206. At the same time, the charging control circuit 207 turns off the FET 212 (the FET 212 is disconnected) to stop charging of the secondary battery 210 and to stop output of the DC-DC converter 209. With this control, supplying power from the secondary battery 210 can be performed by using the control signal 200a from the BB IC 200 as a trigger signal before a rapid fluctuation of load occurs, unlike in the related art illustrated in FIG. 1 in which an assist from the secondary battery is performed in accordance with a rapid fluctuation of load. Accordingly, a stable operation of the 3G PAs 205 and the GSM PA 206 can be ensured.

When there is no factor of causing a fluctuation of load, the BB IC 200 notifies again the charging control circuit 207 of the charging IC 215 of that fact by using the control signal 200a. Accordingly, the charging control circuit 207 turns off the FET 214 and turns off supplying power to the 3G PAs 205 and the GSM PA 206. After that, the charging control circuit 207 turns on the FET 212 and restarts charging of the secondary battery 210 from the DC-DC converter 209.

Also, the above-described functions of the charging control circuit 207 and the FET 214 ensure that power is reliably supplied from the secondary battery 210 while the PA is operating. Preferably, the output voltage of the DC-DC converter 209 is set to 4.2 V or more, for example, 4.22 V so that the secondary battery 210 can be fully charged. Even when such a setting is performed, the charging control circuit 207 can control the FET 214 and limit the voltage that is to be applied to the 3G PAs 205 and the GSM PA 206 to 4.2 V, which is a maximum allowable voltage thereof. Accordingly, a stable PA operation can be ensured.

Furthermore, the maximum voltage of the secondary battery itself limited by the operation voltage of the 3G PAs 205 and the GSM PA 206 can be increased when the charging control circuit 207 controls the FET 214 and limits the voltage. Accordingly, the degree of freedom of a combination of a battery voltage and a charging voltage can be increased.

FIG. 3 is a flowchart illustrating an operation example of the charging control circuit 207 that performs the above-described control.

This process branches into two processes in accordance with whether the DC voltage 208 supplied from the outside is in an on state or not (S11). The on state of the DC voltage 208 can be detected by the charging control circuit 207.

When the DC voltage 208 is in an on state, the charging control circuit 207 turns off the FET 213, turns off supplying power from the secondary battery 210 to the power supply IC 204, turns on the FET 212, and turns on supplying power from the DC-DC converter 209 to the power supply IC 204 (S12). Furthermore, in this state, the charging control circuit 207 determines whether any of the power amplifiers (PAs) has been turned on or not on the basis of the control signal 200a (S13). If any of the power amplifiers (PAs) has been turned on, the charging control circuit 207 turns off the FET 212 and turns on the FET 214, thereby supplying power from the secondary battery 210 to the PA (S14). At this time, the FET 214 is off in a default state.

If it is determined in step S13 that all the power amplifiers (PAs) are off, the charging control circuit 207 turns off the FET 214, thereby stopping supplying power from the secondary battery 210 to the PAs (S15). At this time, the FET 212 is kept in an on state.

If it is determined in step S11 that the DC voltage 208 is in an off state, the charging control circuit 207 turns off the FET 212 and turns on the FET 213, thereby turning on supplying power from the secondary battery 210 to the power supply IC 204 (S16). Furthermore, in this state, the charging control circuit 207 determines whether any of the power amplifiers (PAs) has been turned on in accordance with the control signal 200a (S17). If any of the power amplifiers (PAs) has been turned on, the charging control circuit 207 turns on the FET 214, thereby supplying power from the secondary battery 210 to the PA (S18).

If it is determined in step S17 that all the power amplifiers (PAs) are off, the charging control circuit 207 turns off the FET 214, thereby stopping supplying power from the secondary battery 210 to the PAs (S19). At this time, the FET 212 is kept in an on state.

The preferred embodiment of the present invention has been described above. Other than the above-described embodiment, various modifications and changes are acceptable.

For example, FETs are used as switches in the embodiment, but the switches are not necessarily limited to FETs. An example of a multi-band with a plurality of power amplifiers (PAs) has been described in the embodiment, but a single band with a single power amplifier may also be used. Also, a description has been given about a portable phone terminal in the embodiment, but any other portable electronic apparatuses may be used as long as the apparatus includes a device that consumes a relatively large amount of power, a device that consumes a relatively small amount of power, and a secondary battery.

It should be understood by those skilled in the art that various modifications, combinations, sub-combinations and alterations may occur depending on design requirements and other factors insofar as they are within the scope of the appended claims or the equivalents thereof.

What is claimed is:

1. A portable electronic device comprising:
   a battery;
   a direct current (DC) power source;
   a first device that consumes a first amount of power during operation;
   a second device that consumes a second amount of power during operation, the second amount of power being more than the first amount of power;
   a first switch provided in a charging path between the DC power source and the battery;
   a second switch provided in a path for supplying power from the battery to the second device;
   a third switch provided in a path for supplying power from the battery to the first device; and
   a charging control circuit configured to
      control the first switch to be disconnected, the second switch to be connected, and the third switch to be disconnected when external power is supplied via the DC power source and the second device is operational;
      control the first switch to be connected, the second switch to be disconnected, and the third switch to be disconnected when external power is supplied via the DC power source and the second device is not operational;
      control the first switch to be disconnected, the second switch to be connected, and the third switch to be connected when external power is not supplied via the DC power source and the second device is operational; and
      control the first switch to be disconnected, the second switch to be disconnected, and the third switch to be connected when external power is not supplied via the DC power source and the second device is not operational.

2. The portable electronic device of claim 1, further comprising:
   a control device configured to transmit a control signal to the charging control circuit indicating that the second device is operational.

3. The portable electronic device of claim 2, wherein
   the charging control circuit is configured to control the second switch to be connected and the first switch to be disconnected upon receiving the control signal from the control device.

4. The portable electronic device of claim 1, wherein the DC power source is a DC-DC converter that decreases a voltage of the externally supplied power.

5. The portable electronic device of claim 4, wherein
   an output voltage of the DC-DC converter is higher than a maximum voltage output by the battery.

6. The portable electronic device of claim 1, wherein
   the second device includes a power amplifier.

7. The charging apparatus of claim 1, wherein
   the charging control circuit is configured to receive a control signal from a control device indicating that the device is operational.

8. The charging apparatus of claim 7, wherein
   the charging control circuit is configured to control the second switch to be connected and the first switch to be disconnected during the charging upon receiving the control signal from the control device.

9. A charging apparatus for a portable electronic device, the charging apparatus comprising:
   a direct current (DC) power source;
   a first switch provided in a charging path between the DC power source and a battery;
   a second switch provided in a path for supplying power from the battery to a device that consumes a larger amount of power during operation as compared to another device in the portable electronic device;
   a third switch provided in a path for supplying power from the battery to the another device; and
   a charging control circuit configured to
      control the first switch to be disconnected, the second switch to be connected, and the third switch to be disconnected when external power is supplied via the DC power source and the second device is operational;
      control the first switch to be connected, the second switch to be disconnected, and the third switch to be disconnected when external power is supplied via the DC power source and the second device is not operational;
      control the first switch to be disconnected, the second switch to be connected, and the third switch to be connected when external power is not supplied via the DC power source and the second device is operational; and control the first switch to be disconnected, the second switch to be disconnected, and the third switch to be connected when external power is not supplied via the DC power source and the second device is not operational.

10. The charging apparatus of claim 9, wherein the DC power source is a DC-DC converter that decreases a voltage of the externally supplied power.

11. The charging apparatus of claim 10, wherein an output voltage of the DC-DC converter is higher than a maximum voltage output by the battery.

12. The charging apparatus of claim 9, wherein the second device includes a power amplifier.

13. An electronic device comprising:
a direct current (DC) power source;
a first device that consumes a first amount of power during operation;
a second device that consumes a second amount of power during operation, the second amount of power being more than the first amount of power;
a first switch provided in a path for supplying power from the battery to the second device;
a second switch provided in a path for supplying power from the battery to the first device; and
a charging control circuit configured to
control the first switch to be connected and the second switch to be disconnected when external power is supplied via the DC power source and the second device is operational;
control the first switch to be disconnected and the second switch to be disconnected when external power is supplied via the DC power source and the second device is not operational;
control the first switch to be connected and the second switch to be connected when external power is not supplied via the DC power source and the second device is operational; and
control the first switch to be disconnected and the second switch to be connected when external power is not supplied via the DC power source and the second device is not operational.

* * * * *